No. 692,203. Patented Jan. 28, 1902.
G. E. LE CLAIR.
MACHINE FOR MAKING WOOD FIBER.
(Application filed Feb. 15, 1901.)

(No Model.) 2 Sheets—Sheet 1.

ATTEST.
R. B. Moser
H. E. Mudra

INVENTOR
George E. Le Clair
By H. T. Fisher ATTY

No. 692,203. Patented Jan. 28, 1902.
G. E. LE CLAIR.
MACHINE FOR MAKING WOOD FIBER.
(Application filed Feb. 15, 1901.)
(No Model.) 2 Sheets—Sheet 2.
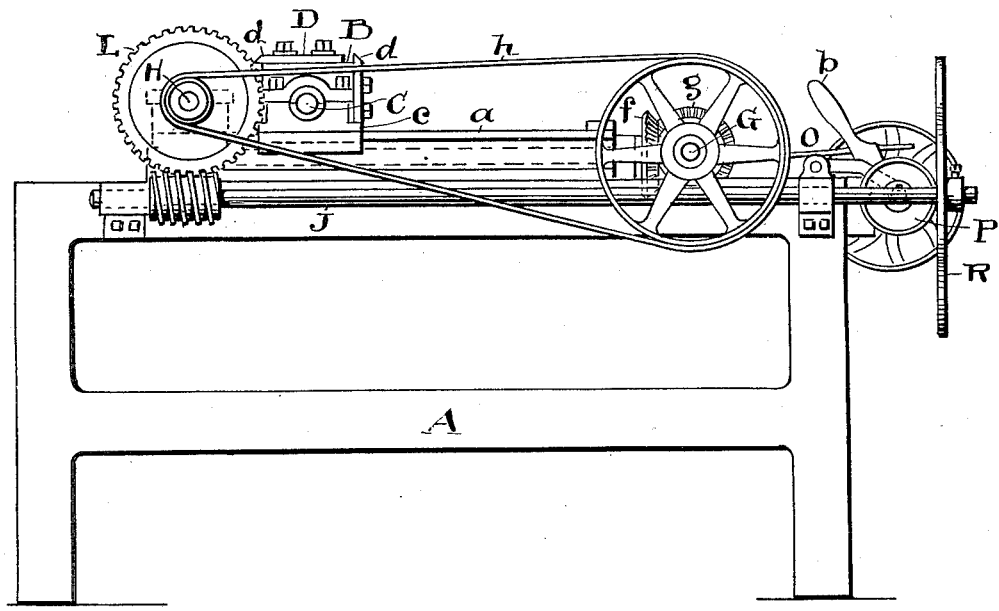
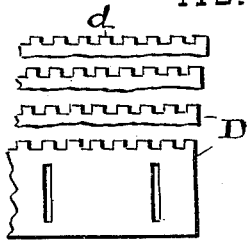
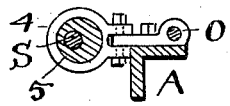
ATTEST.
R. B. Moser
H. E. Mudra
INVENTOR.
George E. Le Clair
BY H. V. Fisher
ATTY

UNITED STATES PATENT OFFICE.

GEORGE E. LE CLAIR, OF ELYRIA, OHIO.

MACHINE FOR MAKING WOOD FIBER.

SPECIFICATION forming part of Letters Patent No. 692,203, dated January 28, 1902.

Application filed February 15, 1901. Serial No. 47,450. (No model.)

*To all whom it may concern:*

Be it known that I, GEORGE E. LE CLAIR, a citizen of the United States, residing at Elyria, in the county of Lorain and State of Ohio, have invented certain new and useful Improvements in Machines for Making Wood Fiber; and I do declare that the following is a full, clear, and exact description of the invention, which will enable others skilled in the art to which it appertains to make and use the same.

My invention relates to a machine for making what is known to the trade as "wood fiber;" and the invention consists in a machine constructed and having the combination of parts substantially as shown and described, and particularly pointed out in the claims.

Figure 1:
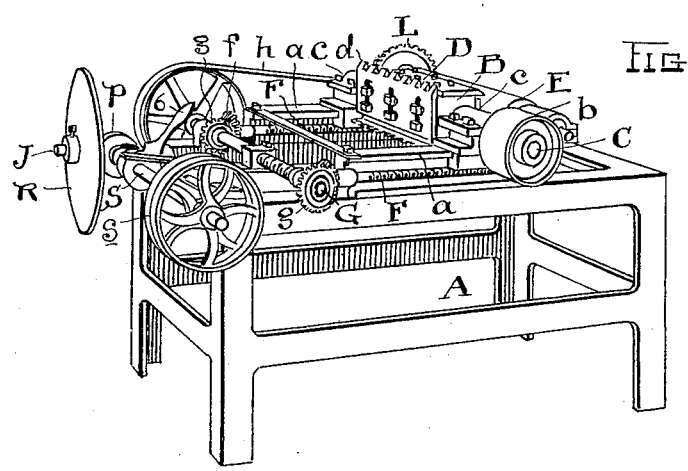
Figure 2:
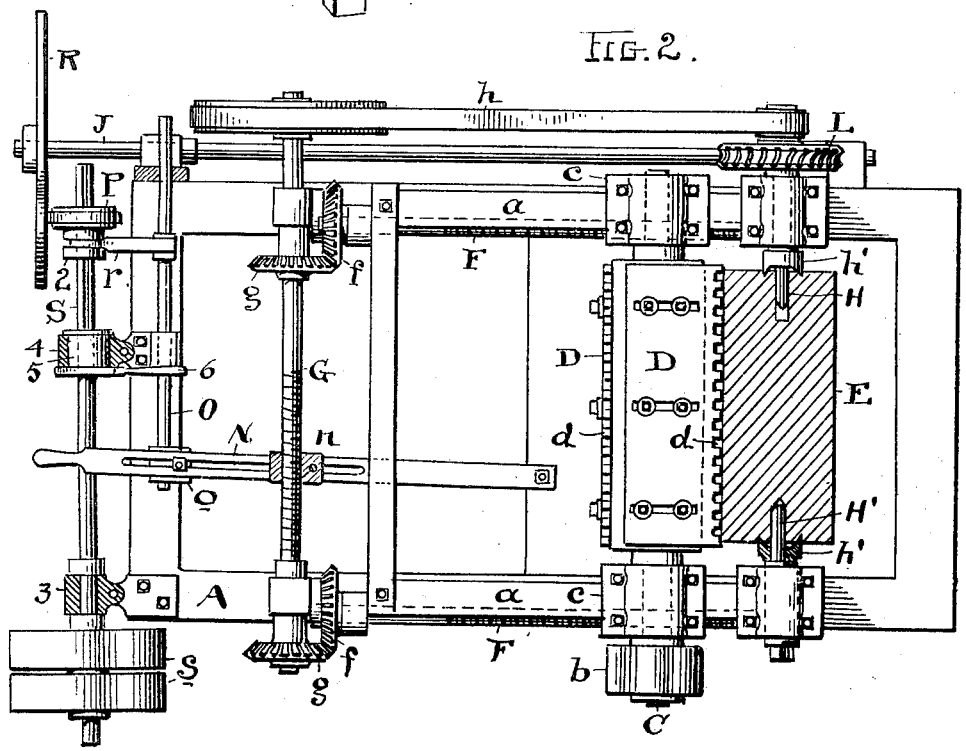

In the accompanying drawings, Figure 1 is a perspective elevation of my machine looking from one side and the rear. Fig. 2 is a plan view thereof, showing a few of the parts in section. Fig. 3 is a plain side elevation of the machine looking from the side opposite that seen in Fig. 1, which reverses the position of the machine in the drawings. Fig. 4 is a face view of a series of sections of cutter-blades, serving to illustrate especially the staggered relation of the teeth from blade to blade. Fig. 5 is a detail view of the eccentric means for throwing the friction-disk shaft.

In the machine thus shown I have a mechanism adapted to reduce a log of wood or section of a tree to bits of fiber of a more or less shredded or wooly character adapted to be used for various commercial purposes, and especially in the manufacture of prepared plaster, such as is used in plastering the walls of houses and the like.

To these ends the machine is comprised in a suitable frame A and a rotatable or revolving cutter-head B, carried by a shaft C, supported in sliding or slidable bearings c on guideways a on frame A. Power is applied directly to this shaft through pulley b. In this machine the block or head B is shown as a four-sided parallelogram fixed on shaft C and having an adjustable blade D on each of its four sides and with teeth d, preferably of the shape shown most clearly in Fig. 4, where they have substantially a chisel shape in face view, while in Fig. 3 they are also shown as beveled to a sharp edge. These teeth may, however, be of a different shape, if preferred, and be within the invention, and they are so arranged on the cutter-head that they come in staggered relation to their work, thus operating upon all parts of the log of wood E equally and reducing the product to uniform quality. Said blades D are slotted, so as to be adjustable as they wear away, and the head B might be constructed with five or six or more faces to receive more blades, if desired. This construction enables any one blade to be removed at a time for sharpening or repairs, and if a tooth be broken off the blade can be recut with new teeth throughout and restored to work with wider blades and do as perfect work as originally.

The bearings c for head B and its shaft C are adjustable back and forth on guideways a by screw-shafts F at each side engaging teeth in said bearings, whereby the cutter-head is moved gradually up to the work as the work is reduced by cutting away the fiber, and this adjustment is automatic and mechanical through shaft G, transversely arranged on frame A near its rear end and carrying bevel-gears g, which mesh with bevel-gears f on screw-shafts F. Shaft G is driven by a band h from a sheave on the short shaft H, which enters the wood log at one end and through which power is applied to said log to rotate the same while it is being worked up by the cutter-blades. A comparatively slow but uniform and definite rotation of the log is required, and this is effected by a variable-speed shaft J, having a worm-thread at one end engaging the periphery of worm-wheel L, which is fixed on short shaft H and rotates the same. A corresponding short shaft H' carries the opposite end of log E, and a dog or toothed chuck h' on each short shaft engages the log and forcibly rotates the same with said shafts in their bearings on frame A.

Shaft G is threaded in part of its body portion, and a nut n on lever N engages with the thread on said shaft, and toward its outer end the said lever has engagement with a controlling-rod O for the speed-varying mechanism running to log E. A clip or its equivalent o is pivotally secured in a slot in lever N, as is also nut n, so as to turn more or less in respect to the lever when the lever swings to right or left. These or equivalent means and constructions may be used for connecting shaft G and rod O, and said rod travels in its bearings lengthwise slowly and gradually to carry friction-disk P nearer to the center of disk R, as log E is reduced in diameter or cross-section and requires more rapid rotation than when it was larger, in order to keep up a uniform speed at or on the surface of said log. An arm r on rod O engages collar or hub 2 on friction-wheel P to slide said wheel on the splined shaft S, carrying the same, and said shaft is independently operated by power to or upon its sheaves s. Shaft S is supported, as here shown, in two loosely-supported bearings 3 and 4, and bearing 4 is of the nature of a shell or collar, in which is an eccentric 5, controlled by a handle 6. In this way disk P can be thrown to disk R by throwing lever 5 to one side or the other. It does not require much movement of shaft S at its end to disengage wheel P, and arm r is loose enough on collar 2 to allow this adjustment to be made. Thus it will be seen that the speed of revolution of log E controls the speed of feed of the cutter-head toward said log through belt h and shafts F and G, while the speed of rotation of the log is controlled by the position of disk P on the face of disk R, and the order of operation is from the outer portion of disk R toward its center or middle to increase the speed of rotation of the log as it diminishes in size.

In the foregoing description I have particularized the parts generally, both as to construction and operation; but I do not wish to have the invention regarded as limited to the details thus clearly brought out, because these can be considerably modified or even substituted without departing from the spirit of the invention.

What I claim is—

1. The rotatable cutter-head and the shaft carrying said head, and bearings supporting said shaft, in combination with worm-shafts engaging said bearings to adjust the same, a screw-shaft geared with said worm-shafts and means to impart varying speed to said screw-shaft, substantially as described.

2. The cutter-head and the movable bearings supporting the ends thereof, screw-shafts engaging said bearings to adjust the same, and a transverse shaft geared with each of said worm-shafts, in combination with the log-rotating shaft, power connections between said log-rotating shaft and said transverse shaft, and speed-varying mechanism operatively connected with said log-rotating shaft comprising a set of friction-disks disposed at right angles to each other, and a lever operatively engaged on the said transverse shaft to change the relations of said disks, substantially as described.

3. In a wood-fiber cutting-machine, a set of speed-varying disks adjustably arranged in respect to each other, a log-carrying shaft and power connections from said disks to said shaft, in combination with a cutter-head, bearings on which said head is fed toward the log, a set of screw-shafts to adjust said bearings, and means to rotate said screw-shafts jointly comprising a transverse shaft G, and gears to said screw-shafts, and power connections from said transverse shaft to the said log-carrying shaft, substantially as described.

Witness my hand to the foregoing specification this 4th day of February, 1901.

GEORGE E. LE CLAIR.

Witnesses:
R. B. MOSER,
H. T. FISHER.